March 10, 1959

A. C. DAMAN 2,876,905

APPARATUS FOR CONCENTRATING PULP

Filed March 14, 1955

INVENTOR.
Arthur C. Daman
BY

ATTORNEY

March 10, 1959     A. C. DAMAN     2,876,905
APPARATUS FOR CONCENTRATING PULP
Filed March 14, 1955     4 Sheets-Sheet 2
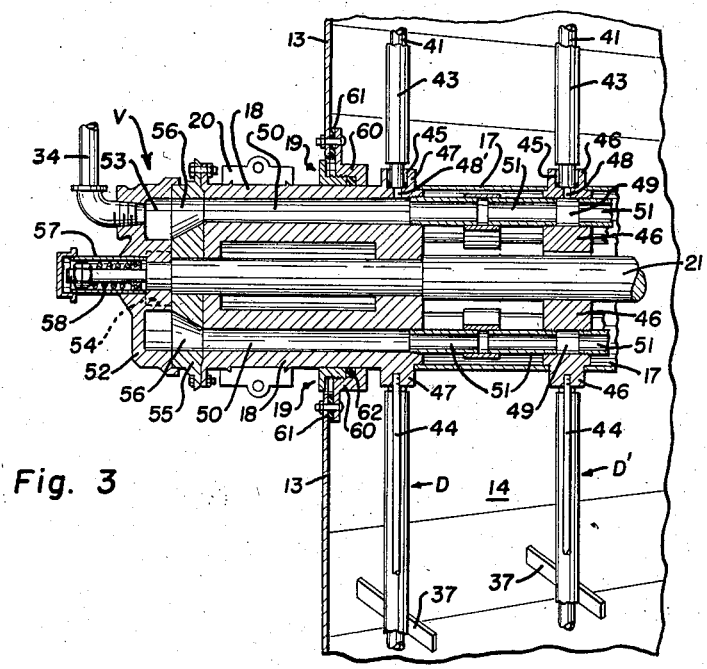
Fig. 3
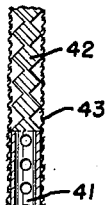
Fig. 4
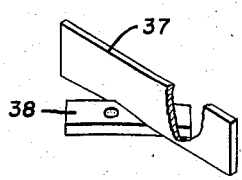
Fig. 5
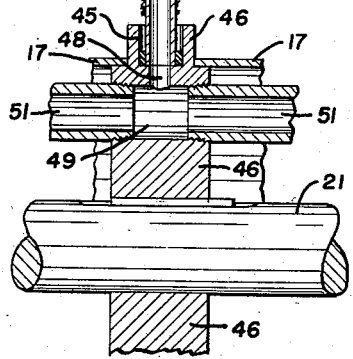
INVENTOR.
Arthur C. Daman
BY
Horace B. Van Valkenburgh
ATTORNEY March 10, 1959  A. C. DAMAN  2,876,905
APPARATUS FOR CONCENTRATING PULP
Filed March 14, 1955  4 Sheets-Sheet 3

INVENTOR.
Arthur C. Daman
BY
Horace B. Van Valkenburgh
ATTORNEY

March 10, 1959  A. C. DAMAN  2,876,905
APPARATUS FOR CONCENTRATING PULP
Filed March 14, 1955  4 Sheets-Sheet 4

INVENTOR.
Arthur C. Daman
BY
ATTORNEY

United States Patent Office 2,876,905
Patented Mar. 10, 1959

2,876,905

APPARATUS FOR CONCENTRATING PULP

Arthur C. Daman, Denver, Colo., assignor, by mesne assignments, to Denver Equipment Company, Denver, Colo., a corporation of Colorado Application March 14, 1955, Serial No. 494,167

14 Claims. (Cl. 210—298)

This invention relates to apparatus for concentrating pulp, and more particularly to such apparatus which is adapted to remove liquid from a slurry or pulp and thereby provide a pulp having a greater density or concentration of solids.

Filters are normally utilized for separating solid particles by removing liquid from a slurry or pulp, usually consisting of a liquid carrying suspended solids of uniform or varying degrees of fineness. The liquid is commonly water, although it may be almost any other type of liquid, while the separated particles may be washed prior to discharge from the filter to displace liquid remaining in the solids cake. For reducing the amount of liquid in a pump, either as a step preliminary to filtering or for other purposes, a settling tank or thickener may be utilized. In general, the operation of a thickener is normally less expensive than that of a filter, but there are definite limitations on the use of thickeners. In a thickener, the solid particles settle by gravity to the bottom of a tank and the liquid from which the solids have settled may be overflowed or removed at the top of the tank. However, when the incoming pulp contains fines in substantial amounts, the fines are so small that they do not settle to the bottom of the tank but remain in suspension. Also, it is difficult to flocculate the fines to cause agglomeration and a resultant increase in size of adhering particles, so that, in effect, the adhering particles will be sufficiently large to settle by gravity. Since a filter does not depend on gravity for separation, but rather on suction to remove liquid, fines can be separated by a filter, but complete separation of the solids is not necessary, so that use of the usual type of filter for concentrating a pulp containing fines is uneconomical.

Commercial filters are made in many different types, such as the disc type filters, drum type filters and filter presses or stationary leaf type filters. A disc type filter ordinarily comprises a tank for containing the pulp, a plurality of discs having segments and rotated about a horizontal axis through the pulp in the tank, a horizontal hollow shaft on which the discs are mounted and containing the piping connections to the disc segments, drive means for the shaft and a special type of valve for producing a vacuum within the segments as they move through the pulp and pressure in the segments as they approach a scraper or other device which removes the cake disposed on the outer surface of the segments as the filtrate is drawn by the vacuum into the interior of the segments, while the segments move through the pulp. The valve may be located at one end of the tank and the drive means for the shaft at the other, although both may be located at the same end. In drum type filters, a horizontal rotating shaft is again employed, but a filter cloth extends, either internally or externally, circumferentially around a drum divided into radial segments to which suction is applied through suitable valve means, operable similarly to the valve means for a disc type filter. Also, pressure may be supplied to each segment just before it reaches a scraper extending horizontally along one side of the drum for removing the collected cake. Wash water may be sprayed onto the cake prior to removal thereof and the displaced liquid and wash water may be pulled into the drum segments by suction. In both the drum and the disc type filters, the level of pulp in the tank is maintained below the level of the horizontal shaft.

In the filter press or stationary leaf type of filter, a series of usually rectangular leaves covered by a cloth bag are immersed in a body of pulp and suction is applied to the interior of the leaves so that the solid particles will be deposited as a cake on the filter cloth on each side of each leaf. However, the operation of a filter press is discontinuous, that is, as soon as the cake has built up to the extent that further build up of the cake is too slow to be economical, the filter is taken out of operation; the leaves are then removed and the cake shaken or scraped off the filter cloths. This involves hand operations and a resultant high labor cost. Thus, for concentrating purposes, continuously operating equipment is preferably employed.

Among the objects of this invention are to provide novel apparatus which is particularly adapted to be utilized for concentrating pulp; to provide such apparatus which is similar in many respects to a conventional filter, but which differs therefrom both in construction and mode of operation; to provide such apparatus which may be operated continuously and with a relatively high liquid removal capacity; to provide such apparatus which does not require drive connections additional to those of a conventional filter; to provide such apparatus which may exist in more than one form and with variations in each; to provide such apparatus which may be constructed with comparative economy; and to provide such apparatus which will operate with relatively high efficiency.

Additional objects and the novel features of this invention will become apparent from the description which follows, taken in connection with the accompanying drawings, in which:

Fig. 3 is a fragmentary horizontal section, taken along line 3—3 of Fig. 1;

Fig. 4 is a fragmentary, offset vertical section, taken along line 4—4 of Fig. 2;

Fig. 5 is a perspective view of a special attachment, connected at a plurality of points to the periphery of each of the discs of the apparatus of Fig. 1;

Figure 1:
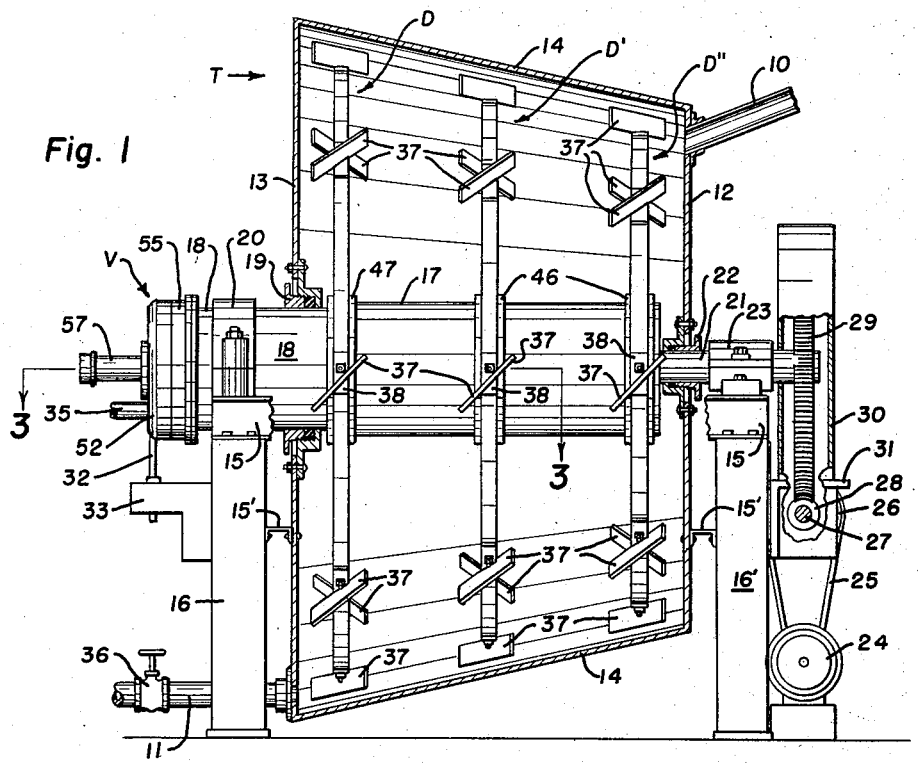
Fig. 1 is a longitudinal section of apparatus, similar to a disc type filter, constructed in accordance with this invention and particularly adapted to be utilized in concentrating pulp.
Figure 2:
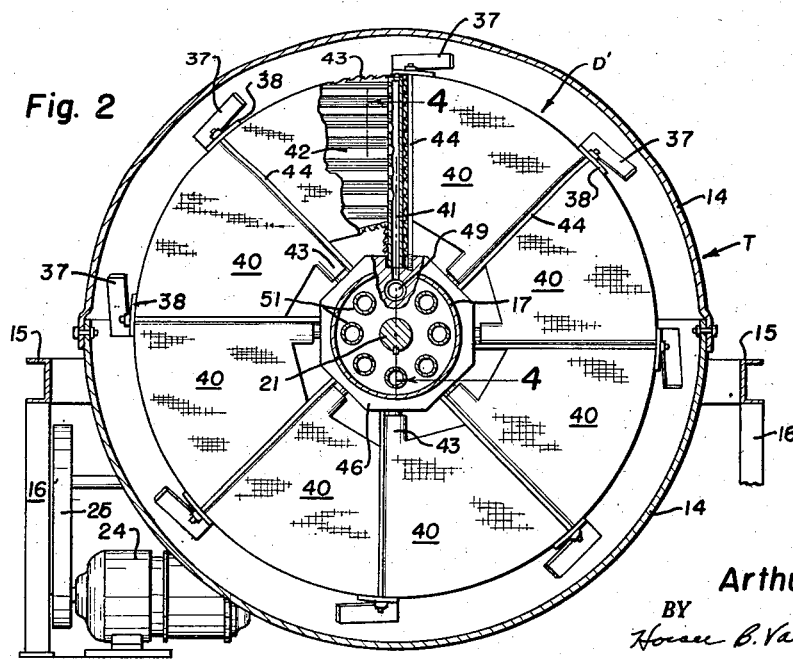
Fig. 2 is a transverse vertical section of the apparatus of Fig. 1, with certain parts of a liquid removal disc broken away to show the interior construction more clearly.

As illustrated in Figs. 1-5 inclusive, the principles of this invention may be embodied in apparatus similar to a disc type filter and which includes a tank T adapted to contain a body of pulp introduced therein adjacent the upper end through an inlet pipe 10, the concentrated pulp being removed through an outlet pipe 11 at the bottom of the tank T. The tank T may have any desired shape, although a convenient shape, as shown in Fig. 1, corresponds to a frustrum of a cone disposed on its side, the tank T thus having a smaller annular end 12 and a larger annular end 13, with a frustro conical wall 14 extending between the outer peripheries of the ends. The ends 12 and 13 and wall 14 may be formed from one or more plates, as desired, while the inlet pipe 10 conveniently connects with the end 12 adjacent the top thereof and the outlet pipe 11 with the end 13 at the bottom thereof. Due to the shape of the tank T, concentrated pulp tends to flow along the bottom toward the outlet 11, although other shapes of the tank may be utilized, such as generally cylindrical and provided with a collecting trough at the bottom leading to the outlet pipe or a pair of frustro conical segments with the larger ends facing toward each other and the point of discharge at the lowest point. The tank T may be supported by beams 15 and brackets 15' attached to the respective ends 12 and 13 and mounted on standards 16 and 16', disposed at opposite ends of the tank. A horizontal drum 17 may be connected at one end to a cylindrical block 18 which extends through a suitable seal, such as a packing gland 19 mounted at the center of the tank end 13 with block 18 adapted to rotate in a pillow block bearing 20 mounted atop standard 16. The opposite end of the drum 17 may be supported by a shaft 21 which extends through the opposite end 12 of the tank at a suitable seal, as provided by a packing gland 22, similar to gland 19, which is described in greater detail later. Shaft 21 preferably extends centrally through drum 17 and may rotate in a smaller pillow block bearing 23 mounted atop standard 16', thereby supporting the opposite end of the drum 17 for rotation. The drum 17 and block 18 may conveniently be rotated through shaft 21, as by an integral speed reduction motor 24 connected by belt 25 with a pulley 26 mounted on one end of a worm shaft 27, with the worm 28 on shaft 27 engaging a worm gear 29, in turn mounted on the extending end of shaft 21. The worm and gear may be enclosed within a housing 30 suitably supported on standard 16', as by a bracket 31, the bracket 31 also conveniently supporting the bearings for worm shaft 27. A control valve V, certain details of which are described later, is connected to the block 18, the non-rotating parts of the valve V being held stationary by a rod 32 which is connected to a bracket 33 mounted on standard 16.

A series of liquid removal elements, such as segmental discs D, D' and D", are mounted within tank T and in accordance with this invention are preferably completely immersed in the pulp, so that suction may be maintained on the discs through about 300° to 320° of rotation thereof, i. e., except at the bottom at which air under pressure may be supplied to the discs to blow off the cake of particles, including fines, collected thereon through removal of liquid by suction. The supply of suction and pressure to the discs is controlled by valve V, to which is connected a suction pipe 34 of Fig. 3, and a pressure pipe 35 of Fig. 1. It is to be noted that the cake which collects on the disc segments comprises an agglomeration of particles, which, when discharged from the discs, can settle by gravity to the bottom of the tank T. Also, by the preferred complete submersion of the discs in the pulp, suction may be utilized for a considerably greater portion of the disc rotation than in the normal disc type filter. In addition, due to tank T being closed and in further accordance with this invention, the pump is supplied to the interior of tank T at a suitable pressure, such as 20 to 100 lbs. per sq. in., as by a pump connected to inlet pipe 10, and pressure is maintained in the tank, as by a valve 36 in outlet pipe 11. Such pressure not only increases the liquid removal capacity of the discs, but also, through the pressure in the pulp body, enhances the tendency for the fines to agglomerate, i. e., the pressure tends to compact the collected particles. Thus, when agglomerated fines are discharged from the discs by pressure from within the discs, there is less tendency for agglomerated particles to segregate and again become suspended in the pulp.

In further accordance with this invention, each disc D, D' and D" is provided with means for moving the solids, discharged at the bottom of the path of travel of each disc segment, toward the outlet. Such means may comprise a series of blades or paddles 37 mounted on each disc, each blade 37 being conveniently mounted on a clamp 38, such as by being welded thereto, as in Fig. 5, the clamps 38 being conventional parts of the discs when utilized in a conventional filter, the preferred construction of which is described below. The blades 37 may be made from bar stock, although any other suitable shape of blade may be utilized, but preferably extend at an acute angle to the plane of each disc so that as the paddles rotate with the discs, as each paddle reaches the bottom of its path of travel, solids discharged from the disc segment will tend to be moved along the bottom of the tank toward the outlet pipe 11.

Each disc D, D' and D" may be constructed in the manner disclosed and claimed in U. S. Patent No. 2,460,280, granted February 1, 1949, each disc thus including a plurality of segments 40, as in Fig. 2, with each segment including a radially extending pipe 41, as in Figs. 2 and 4, through which suction and pressure may be produced in the individual segments. Each segment also may include a segmental block 42 having parallel slots therein on each side with each block 42 disposed inside a segmental filter cloth bag 43, the open outer ends of which are folded over and either tacked to the block 42, which is preferably made of wood, or clamped against the block in a suitable manner, while the bag 43 also encloses the pipe 41. Each clamp 38 is held in position by a nut tightened on the end of a radial rod 44, while the inner end of each pipe 41 extends into a well 45 provided at the position of each pipe 41 in a block 46 mounted on shaft 21 at the position of each disc D' and D", or in a flange 47 of block 18 at the position of disc D, as in Figs. 3 and 4. Each rod 44 is mounted on flange 47 or block 46 and supports the segment in position, while clamps 38 hold each segment against the block 46 or flange 47. Drum 17 may be made in sections, with one section extending between block 18 and a block 46 and the other section extending between two blocks 46, as in Fig. 1. Pipe 41 may be sealed in well 45 in a suitable manner, as by a gasket of rubber or rubber-like material at the inner end, while the interior of each well 45 in each block 46 communicates through a radial hole 48 with an axial hole 49 in block 46 and each well 45 in flange 47 communicates through a radial hole 48' with a longitudinal passage 50 in block 18. The radial holes 48 and 48' as well as axial holes 49 and passages 50 are, of course, positioned in radial alignment with the wells 45, while a series of coupled pipes 51 connect the axially aligned holes 49 of the respective blocks for each disc D' and D" as in Figs. 3 and 4, as well as the passages 50 with the holes 49 for disc D'.

Valve V, as in Fig. 3, includes a non-rotating header 52 which is provided with an arcuate suction distributing chamber 53, connected by suction pipe 34 with a suitable source of suction or vacuum. Chamber 53 extends for 300° to 320° around header 52, while a pressure chamber 54 extends around the remaining periphery of the header, except for the walls between the chambers. Pressure chamber 54 is connected by pressure pipe 35 of Fig. 1 with a suitable source of air under pressure and is conveniently located at the bottom of header 52 so that pressure will be supplied to the disc segments 40 at the bottom, the blow thus produced serving to discharge the cake of solids collected on the sides of filter cloths 43 during the time that suction is applied to the interior of the respective segments, as indicated previously. A circular wear plate 55 is attached to the outer end of block 18, the block 18 and wear plate 55 being mounted on shaft 21 and rotating therewith and wear plate 55 also being provided with axial holes 56 in alignment with passages 50 of block 18 for transmission of suction and pressure to the segments of disc D and thence through pipes 51 to the segments of discs D' and D''. As shown, the outer ends of holes 56 in plate 55 may be enlarged to correspond to the axial width of the suction and pressure chambers in header 52. A tubular housing 57 may enclose a spring 58 which transmits pressure from the end of shaft 21 against header 52 to hold the header and wear plate 55 in engagement at all times.

The packing gland 19, as in Fig. 3, may be circular and threaded into a well ring 60, conveniently split for ease in installation and having an extending flange bolted to end 13 of the tank, with a gasket 61 therebetween, while packing 62 is compressed against block 18 by gland 19 to prevent leakage. As indicated previously, gland 22 and the parts associated therewith at the opposite end 12 of the tank may be similarly constructed, except that the packing is compressed against shaft 21.

The principles of this invention may also be embodied in apparatus similar to a radial leaf type of filter, as illustrated in Figs. 6–10, inclusive. Such apparatus may include a generally cylindrical tank T' having a cylindrical side wall or body 64 closed by a top 65 and an inverted conical bottom 66, the latter being provided with an inverted conical outlet 67 at the center thereof. An inlet pipe 68 may be connected to tank T' adjacent the top of side walls 64 thereof, or be connected to top 65, while an outlet pipe 69 may be provided with a valve, as before, for retaining and controlling pressure in the tank, or the pressure may be assured by connecting a vertical pipe 70 to outlet pipe 69, with vertical pipe 70 extending for a sufficient distance above the top of tank T to create a hydraulic head and to insure an adequate pressure in the tank.

A beam 71 may extend across the top of the tank to support a liquid removal assembly which includes a plurality of liquid removal elements, such as leaves L, mounted on a cylindrical block 72 and a drum 73 through which a vertical shaft 74 extends, the assembly being supported by and rotated about a vertical axis in a combination sleeve and thrust type bearing 75 mounted on beam 71. Also, a packing gland 19', similar to packing gland 19 of Fig. 3, may be provided at the position at which block 72 extends through top 65. The lower end of shaft 74 would ordinarily terminate at the bottom of drum 73 if in a radial leaf type filler, but in the present instance extends below the leaves L, for a purpose hereinafter described. Both the drive means and a valve V' may be mounted at the upper end of the shaft 74, the drive means including a worm 28' engaged by a worm gear 29', driven by a motor 24', which is preferably provided with an integral speed reducer, although a drive similar to that for the filter of Fig. 1 may be utilized. The worm and worm gear may be enclosed within a housing 30'.

Figure 10:
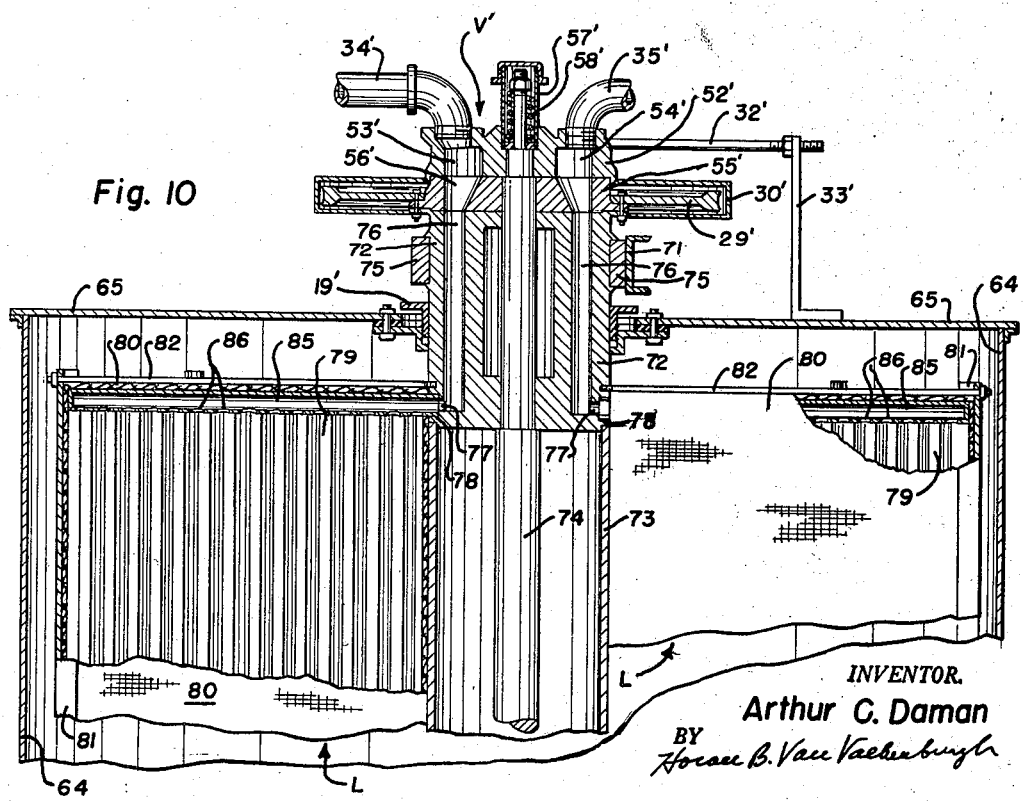
Fig. 10 is an enlarged fragmentary vertical section, taken along line 10—10 of Fig. 6.

The valve V', illustrated in greater detail in Fig. 10, is similar to the valve V of Fig. 3, thus including a header 52', which is non-rotatable and conveniently prevented from rotating by a rod 32', extending from a bracket 33' mounted on the top 65. As before, the header 52' is provided with a suction chamber 53' and a pressure chamber 54', the former being connected to a suction pipe 34' and the latter to a pressure pipe 35', respectively connected to a suitable source of vacuum or suction and a suitable source of air under pressure. Also, as before, the suction chamber 53' extends for a desired amount, such as approximately 300° to 320° around the header 52', while pressure chamber 54' may extend for the remainder, except for a solid section at each side of the pressure chamber to separate the two. Also, as before, a tubular housing 58' encloses a spring 59' which maintains header 52' in engagement with a wear plate 55' containing axial holes 56' in direct alignment with axial passages 76 in the block 72, the holes 56' and passages 76 also being a radial alignment with the leaves L. Also, wear plate 55' is mounted on shaft 74, as before, while worm gear 29' is conveniently attached to the wear plate 55', as by the same bolts which attach the wear plate 55' to the block 72. Passages 76 terminate above the lower end of block 72 and provide suction and pressure communication with the leaves L through radial holes 77, each of which extends inwardly from a well 78.

Figure 8:
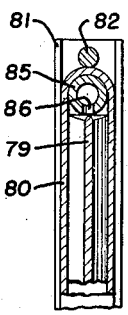
Fig. 8 is a fragmentary vertical section, taken along line 8—8 of Fig. 7 on an enlarged scale.

Each of the leaves L, as in Figs. 8 and 10, may include a rectangular block 79 provided with parallel vertical grooves on each side and disposed inside a rectangular filter cloth bag 80, the open outer ends of which are folded over and tacked to the outer edge of block 79 or merely clamped against the block by a U-shaped bar 81. The bar 81 also holds the block 79 and filter cloth 80 in a radial position through a rod 82, at the upper end, and a rod 83, at the lower end, the inner end of each rod 82 being screwed into the block 72 and the inner end of each rod 83 being screwed into an annular block 84, shown in Fig. 6, which maintains the lower end of drum 73 in axial position with respect to shaft 74. The bars 81 are tightened against the blocks 79 by nuts on the outer ends of rods 82 and 83, although other ways of mounting the leaves on the drum may be utilized. A pipe 85 having holes 86 therein extends radially in each leaf L from a well 78 and radial hole 77 in block 72 to convey suction and pressure to the interior of each leaf L, each pipe 85 being also enclosed within the respective filter cloth bag 80. As will be evident, when suction is supplied through suction chamber 53' to the respective leaves, the liquid inside the tank T' is sucked through each side of each filter cloth bag 80, thus removing liquid from the pulp and causing solid particles to cake on the sides of the filter cloths. When a predetermined point in the revolution of a leaf L is reached, as determined by the position of pressure chamber 54', air pressure is supplied to the leaf through pipe 85 but since the leaf will be full of liquid, sufficient air is supplied to blow only a small amount of liquid out through the filter cloth, i. e., sufficient to discharge the collected solids from the filter cloth. Since these solids are agglomerated, they tend to settle to the bottom of the tank.

Figure 6:
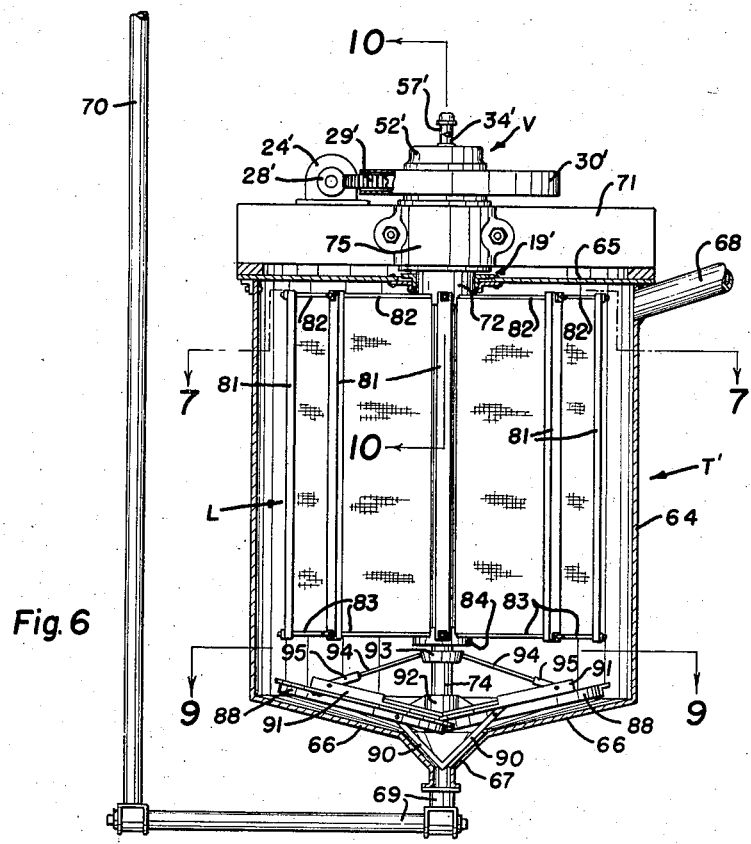
Fig. 6 is a vertical axial section of apparatus, similar to a radial leaf type filter, constructed in accordance with this invention and particularly adapted to be utilized in concentrating pulp.
Figure 7:
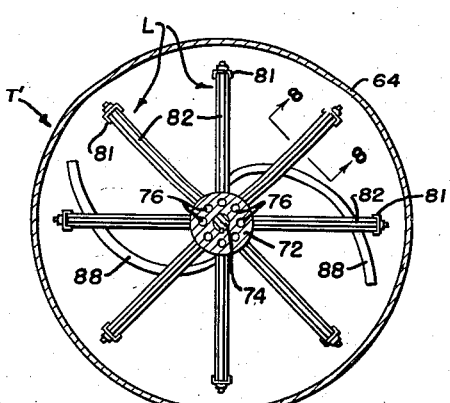
Fig. 7 is a horizontal section, taken along line 7—7 of Fig. 6 adjacent the upper end of a tank which forms a portion of the apparatus of Fig. 6.
Figure 9:
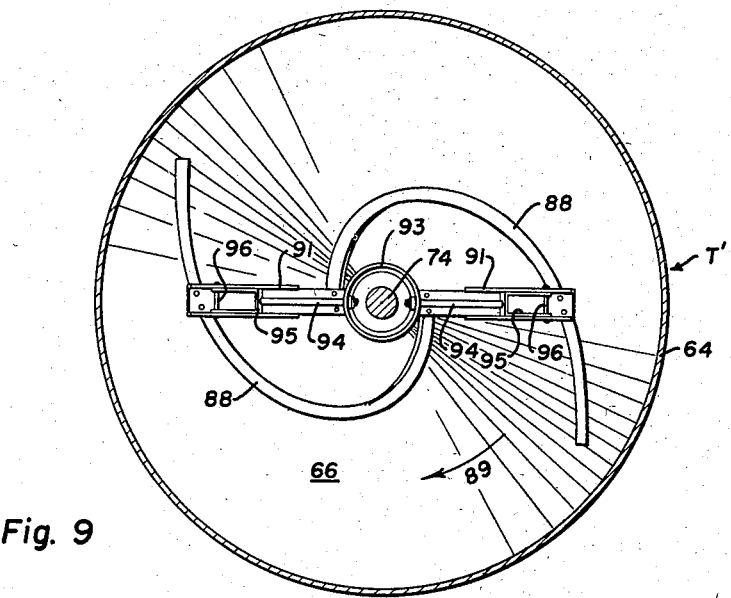
Fig. 9 is a horizontal section, taken along line 9—9 of Fig. 6 adjacent the lower end of the tank.

In further accordance with the present invention, the rotating assembly within the tank is provided with means for moving the pulp solids, tending to settle to the bottom of the tank, toward the outlet 67. Such means is conveniently attached to the lower extending portion of shaft 74, although the same may be attached to block 84 at the lower end of drum 73 or even be mounted on the lower ends of the leaves L. A preferred form of such means is illustrated in Figs. 6, 7 and 9, and includes one or more spiral arms or blades 88, each conveniently having a shape similar to an involute curve, or a modified form thereof. The spiral blades 88 are preferably disposed relatively close to and substantially parallel to the bottom 66 of the tank and face in such a direction that, as will be evident from Fig. 9, when the spiral blades 88 rotate in the direction of arrow 89, agglomerations of solid particles engaged by the blades tend to be moved toward the center of the tank. In addition, a pair of generally upright bars 90, preferably joined together at the bottom and extending upwardly and outwardly at an angle to form a V, may be disposed beneath the spiral blades 88, the angle between the V-bars 90 conveniently being substantially the same as the angle between the sides of the inverted conical outlet 67, while the point or lower end of the V thus formed preferably extends into the outlet. The V-bars 90 tend to move agglomerated solids into the outlet 67, it being noted that the solids are moved toward the V-bars by the spiral blades 88. Each of the spiral blades 88 may be formed from angle stock or other suitable cross sectional shape to provide strength and rigidity, with the inner end of each being attached to a suitable support, such as a channel 91 mounted on a lower hub 92, in turn attached to the lower end of shaft 74, as in Fig. 6. The outer portion of each spiral blade 88, such as at a point spaced inwardly from the extreme end, may be attached to the outer end of the opposite channel 91, with the channels 91 being mounted in diametrically opposite positions, as in Fig. 9. A flanged upper hub 93, as in Figs. 6 and 9, is mounted on shaft 74, such as slightly below the lower end of drum 73, while a pair of suspension rods 94 may extend outwardly and downwardly from hub 93 in diametrically opposite positions, each to a clevis 95 pivotally mounted on a bolt 96 extending between the flanges of a channel 91, as in Fig. 9. The inner end of each channel 91 may also be attached to lower hub 92, while the upper end of each V-bar 90 may be attached to the underside of a channel 91, as in Fig. 6. Of course, other ways of mounting the spiral blades 88 and V-bars 90 may be utilized. In addition, only one blade 88 may be utilized or blades 88 may be formed as a single blade, while only one bar 90 or more than two bars 90 may be utilized.

From the foregoing, it will be evident that apparatus constructed in accordance with this invention fulfills to a marked degree the requirements and objects hereinbefore set forth. In the case of apparatus similar to a disc type filter, the paddles mounted in angular relationship around the peripheral edges of the liquid removal discs move solids discharged from the disc segments toward the outlet. This avoids an accumulation of solids in the bottom of the tank which might cause the fines to become separated and again be carried in the pulp. In apparatus similar to a radial leaf filter, the spiral blades also move solids from any point of discharge toward the tank outlet. In addition, the V-bars tend to keep the outlet clean and permit the flow of agglomerated fines toward the outlet from the bottom of the tank. Neither form of pulp solids moving means disclosed herein requires any additional drive connections for moving the same, other than those utilized in a filter of somewhat similar construction, although the power requirements themselves may be greater. To design such apparatus similar to a disc type filter, all that is necessary is merely to add the angle bars to the clamps which would normally hold the filter segments in position, while to design such apparatus similar to a radial leaf type filter, all that is necessary is to increase the length of the drum shaft. Of course, for each such type of apparatus, the tank is closed and will be slightly larger than if the solid particle moving means of this invention were not utilized. Thus, for apparatus similar to a disc type filter, the diameter of the tank is preferably slightly greater to accommodate the paddles, while for apparatus similar to a radial leaf type filter, the tank is preferably slightly higher to accommodate the spiral blades and V-bars in the lower portion thereof. Since the solid particles moving means of this invention rotates with the liquid removal elements, accumulated solids are moved relatively slowly to the tank outlet. Also, since the liquid removal elements are preferably completely submerged in the pulp, the suction effectiveness of the elements, and in turn the effectiveness and efficiency of the apparatus, is enhanced. Since the tank is completely enclosed, the pulp may be fed into the tank under pressure, so that the pressure of the pulp within the tank will further increase the effect of suction in removing liquid from the pulp and the resultant higher rate of liquid withdrawal and heavier cake on the liquid elements will tend to enhance the tendency for fines to agglomerate and form solids which will settle more readily to the bottom of the tank. Each of the forms of this invention disclosed is readily constructed, requires no additional bearings and also requires no change in the basic construction or design of the liquid removal elements from similar elements used in filters. O course, due to the pressure within the tank, slight variations may have to be made in various parts to accommodate the greater pressure differential across the filter cloths, the probably higher rate of liquid removal and the power required for the solids moving means. It is to be emphasized that, to produce the apparatus of this invention, it is normally not merely necessary only to add parts to a conventional type of filter, even though the same may be done with some probability of success, but that conventional filters offer a sound basis for the design and construction of the apparatus of this invention and the solution to the problems involved, except for the seals necessary for the closed tank, can be based upon experience with conventional filters. Thus, numerous parts proven in service can be utilized and filter experience can be used to good advantage, so that apparatus of this invention may be constructed with comparative economy.

Although different embodiments of the apparatus of this invention have been specifically illustrated and described, it will be understood that other embodiments may exist and that variations may be made, all without departing from the spirit and scope of this invention.

What is claimed is:

1. Apparatus for concentrating pulp, comprising an enclosed tank provided with an upper inlet for pulp and a lower outlet for concentrated pulp; a plurality of liquid removal elements mounted for rotation within the pulp in said tank; means for transmitting suction and pressure to said liquid removal elements; means for supporting and rotating said elements; means for moving pulp solids discharged by pressure from said elements toward said outlet; and means for rotating said pulp solids moving means with said elements.

2. In apparatus, as defined in claim 1, wherein said outlet is provided with means for maintaining pressure of pulp in said tank.

3. Apparatus as defined in claim 2, wherein said means for maintaining pressure of pulp in said tank comprises a valve for controlling flow from said outlet.

4. Apparatus as defined in claim 2, wherein said means for maintaining pressure of pulp in said tank comprises a pipe connected with said outlet and extending to a position above said tank to produce a hydraulic head which will maintain pressure in said tank.

5. Apparatus for concentrating pulp, comprising a tank provided with an upper inlet for pulp and a lower outlet for concentrated pulp, the bottom of said tank sloping to said outlet; a plurality of radial liquid removal discs disposed for rotation about a horizontal axis within the pulp in said tank; means for transmitting suction and pressure to said discs; means for supporting and rotating said discs; and a series of blades attached to the periphery of each of said discs, said blades being inclined angularly to the direction of movement thereof for moving pulp solids discharged from said discs toward said outlet.

6. Apparatus as defined in claim 5, wherein said tank is circular in radial cross section with a smaller diameter at one end and a greater diameter at the opposite end, with said inlet at an upper position at said one end and said outlet at the bottom of said opposite end, and said discs increase in diameter from said one end to said opposite end and said blades are generally parallel to the sloping bottom of said tank.

7. Apparatus for concentrating pulp, comprising a tank provided with an upper inlet for pulp and a lower outlet for concentrated pulp, the bottom of said tank sloping to said outlet; a vertical shaft rotatable in said tank; a plurality of liquid removal leaves extending radially from said shaft and rotating therewith within the pulp in said tank, said shaft extending below said leaves; means for transmitting suction and pressure to said leaves; means for moving pulp solids discharged from said leaves toward said outlet; and means for rotating said pulp moving means and attached to said shaft below said leaves.

8. Apparatus for concentrating pulp, comprising an enclosed tank provided with an upper inlet for pulp and a central lower outlet for concentrated pulp; a plurality of liquid removal leaves extending radially from a vertical axis and disposed for rotation about said axis within the pulp in said tank; means for transmitting suction and pressure to said leaves; means for supporting and rotating said leaves; at least one spiral blade below said leaves for moving pulp solids discharged from said leaves toward said outlet; and means for rotating each said blade with said leaves.

9. Apparatus as defined in claim 8, wherein said tank is provided with an inverted conical bottom and each said spiral blade is disposed in generally parallel relation to said tank bottom.

10. Apparatus for concentrating pulp, comprising an enclosed tank provided with an upper inlet for pulp and a central lower outlet for concentrated pulp, said outlet having an inverted conical shape; a vertical shaft rotatable in said tank; a plurality of liquid removal leaves extending radially from said shaft and rotating therewith within the pulp in said tank; means for transmitting suction and pressure to said leaves; a pair of generally upright bars arranged in a V-shape and extending into said outlet; and means for rotating said bars with said leaves.

11. Apparatus for concentrating pulp, comprising a tank provided with an upper inlet for pulp and a central lower outlet for concentrated pulp said outlet having an inverted conical shape; a vertical shaft rotatable in said tank; a plurality of liquid removal leaves extending radially from said shaft and rotating therewith within the pulp in said tank; means for transmitting suction and pressure to said leaves; at least one spiral blade below said leaves for moving pulp solids discharged from said leaves toward said outlet; at least one generally upright bar disposed angularly and extending into said outlet; and means for rotating each said blade and bar with said leaves.

12. Apparatus for concentrating pulp, comprising an enclosed tank provided with an upper inlet for pulp under pressure and a lower outlet for concentrated pulp, said tank being circular in radial cross section with a smaller diameter at one end and a greater diameter at the opposite end with said inlet adjacent the top of the smaller end of said tank and said outlet at the bottom of the larger end of said tank, the bottom of said tank thereby sloping to said outlet; a shaft rotatable about a horizontal axis and extending through said tank; a drum mounted on said shaft within said tank; a block connected to said drum and extending through one end of said tank, said block having passages for transmitting suction and pressure effects; a series of discs having segments extending radially from said drum and said block and rotatable with said shaft within the pulp in said tank, each said disc segment including a segmental block enclosed by a filter cloth bag, a rod extending radially between adjacent disc segments, and a clamp mounted on the end of each said rod and holding said segments in position, said discs increasing in diameter from said smaller end to said larger end of said tank, corresponding to the increase in the diameter of said tank from said smaller end to said larger end; valve means for controlling the supply of pressure and suction to said block passages and thence to said disc segments; a bearing for said block exteriorly of one end of said tank; a bearing for said shaft exteriorly of the other end of said tank; a packing gland for said block at one end of said tank; a packing gland for said shaft at the other end of said tank; means associated with said outlet for maintaining pressure of pulp within said tank; means for rotating said block and shaft; and a blade attached to each said clamp, each said blade being disposed at an angle to the axis of said shaft and inclined toward said larger end of said tank in the direction of rotation of said discs, the outer edge of each said blade being generally parallel to the sloping bottom of said tank as said blade moves around the bottom of said tank, said blades thereby rotating with said discs at a relatively low speed and thereby being adapted to move toward said outlet agglomerated solids discharged from said bags by pressure supplied to said disc segments as said segments move past the bottom of said tank.

13. Apparatus for concentrating pulp, comprising an enclosed tank provided with an upright cylindrical body, a top and an inverted conical bottom provided with an inverted conical outlet for concentrated pulp at the center thereof, said tank having an inlet for pulp under pressure adjacent its upper end; means associated with said outlet for maintaining pressure of pulp within said tank; a rotatable vertical shaft extending centrally into said tank from above; a drum attached to said shaft within said tank with said shaft extending below said drum; a cylindrical block mounted on said shaft and extending through the top of said tank from above; means for rotating said block and shaft; a packing gland for said block at the top of said tank; a bearing for said block above the top of said tank; radially spaced liquid removal leaves extending radially from said block and drum and rotatable with said shaft within the pulp in said tank, said block having passages for transmitting suction and pressure effects to said filter leaves; valve means for controlling the supply of pressure and suction to said block passages; a lower hub mounted on the lower end of said shaft; a flanged upper hub mounted on said shaft below said drum; a pair of channels extending in diametrically opposite positions from said lower hub and upwardly at an angle corresponding to the slope of the inverted conical bottom of said tank; a spiral blade, angular in cross section, attached at its inner end to the inner end of each said channel and extending spirally and outwardly in a shape corresponding generally to an involute curve to a point adjacent the wall of the body of said tank, each said spiral blade being attached to the outer end of the opposite channel at a point spaced from the extreme outer end of said spiral blade; a rod attached to the flange of said upper hub extending downwardly toward each said channel; a clevis attached to the lower end of each said rod; a pin extending through the flanges of each said channel and pivotally attaching the corresponding clevis to said channel; and a pair of flat bars forming a V-shape joined together at the bottom and attached at their upper ends to the oppositely disposed channels, said V-bars extending into said outlet and the angle between said V-bars corresponding to the angle included between the sides of said inverted conical outlet.

14. Apparatus for concentrating pulp, comprising a tank provided with an upper inlet for pulp and a lower outlet for concentrated pulp; a plurality of radial liquid removal discs disposed for rotation about a horizontal axis within the pulp in said tank; means for transmitting suction and pressure to said discs; means for supporting and rotating said discs; and a series of blades attached to the periphery of each of said discs, said blades being inclined angularly to the direction of movement thereof for moving pulp solids discharged from said discs toward said outlet.

(References on following page)

References Cited in the file of this patent

UNITED STATES PATENTS

| | | |
|---|---|---|
| 1,017,476 | Singer | Feb. 13, 1912 |
| 1,253,162 | Faber | June 8, 1918 |
| 1,379,095 | Genter | May 24, 1921 |
| 1,646,556 | Peck | Oct. 25, 1927 |
| 2,266,402 | Banks | Dec. 16, 1941 |
| 2,460,280 | Finney | Feb. 1, 1949 |
| 2,593,707 | Walker | Apr. 22, 1952 |

FOREIGN PATENTS

| | | |
|---|---|---|
| 465,615 | Germany | Sept. 20, 1928 |
| 158,533 | Switzerland | Feb. 1, 1933 |